US008853588B2

United States Patent
Mao et al.

(10) Patent No.: US 8,853,588 B2
(45) Date of Patent: Oct. 7, 2014

(54) PLASMA TORCH WITH LCD DISPLAY WITH SETTINGS ADJUSTMENT AND FAULT DIAGNOSIS

(75) Inventors: Junsong Mao, Hanover, NH (US); Michael Kornprobst, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 588 days.

(21) Appl. No.: 13/151,799

(22) Filed: Jun. 2, 2011

(65) Prior Publication Data

US 2012/0012564 A1 Jan. 19, 2012

Related U.S. Application Data (60) Provisional application No. 61/365,145, filed on Jul. 16, 2010.

(51) Int. Cl.
*B23K 10/00* (2006.01)

(52) U.S. Cl.
CPC ............... *B23K 10/006* (2013.01); *B23K 10/00* (2013.01)
USPC ............ 219/121.39; 219/121.54; 219/121.55; 219/121.57

(58) Field of Classification Search
CPC ......... H05H 1/36; B23K 10/00; B23K 10/006
USPC .................... 219/121.39, 121.45, 121.48, 75, 219/121.54, 121.55, 121.57
See application file for complete search history.

(56) References Cited

U.S. PATENT DOCUMENTS

| 5,440,477 | A | 8/1995 | Rohrberg et al. |
| 6,772,040 | B1 * | 8/2004 | Picard et al. ................. 700/166 |
| 6,960,737 | B2 * | 11/2005 | Tatham ...................... 219/121.5 |
| 6,995,545 | B2 * | 2/2006 | Tracy et al. .................... 322/45 |
| 7,375,302 | B2 * | 5/2008 | Twarog et al. ............ 219/121.52 |
| 2004/0173583 | A1 | 9/2004 | Iriyama et al. |
| 2005/0077273 | A1 | 4/2005 | Matus et al. |
| 2006/0215389 | A1 | 9/2006 | Fosbinder et al. |
| 2009/0159571 | A1 | 6/2009 | Salsich |
| 2009/0159575 | A1 | 6/2009 | Salsich |
| 2009/0159577 | A1 | 6/2009 | Sommerfeld |
| 2009/0294415 | A1 | 12/2009 | Salsich et al. |

OTHER PUBLICATIONS

Torchmate® Arc Voltage Torch Height Control—Operation Manual, Applied Robotics, Inc., Oct. 2005, pp. 1-19.

* cited by examiner

*Primary Examiner* — Mark Paschall
(74) *Attorney, Agent, or Firm* — Proskauer Rose LLP (57) ABSTRACT

A portable plasma cutting system includes a power supply and a torch attachable to the power supply. The torch generates a plasma arc for cutting a workpiece. A gas valve is disposed in the system or the torch. The gas valve establishes a gas flow rate or a gas pressure in the torch. A controller is within the system and in communication with the power supply. The controller is capable of automatically manipulating the gas valve to establish the gas flow rate or pressure based upon a predetermined operating condition. A user activated switch is in communication with the controller. The switch has a first setting which causes the controller to automatically establish the gas flow rate or pressure based upon the predetermined operating condition, and a second setting which causes the controller to establish one of a user-determined gas flow rate or a user-determined gas pressure.

22 Claims, 9 Drawing Sheets

PLASMA TORCH WITH LCD DISPLAY WITH SETTINGS ADJUSTMENT AND FAULT DIAGNOSIS

RELATED APPLICATIONS

This application claims the benefit of and priority to U.S. Provisional Application No. 61/365,145, filed Jul. 16, 2010, the entirety of which is hereby incorporated herein by reference.

TECHNICAL FIELD

The present invention relates generally to plasma arc cutting torches, and more particularly, to plasma torches with LCD displays with settings adjustment and fault diagnosis.

BACKGROUND

Plasma arc torches are widely used in the cutting, and marking of materials. A plasma torch generally includes an electrode and a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and nozzle. In some torches, a retaining cap can be used to maintain the nozzle and/or swirl ring in the plasma arc torch. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

One category of hand held plasma arc torch systems include a manual gas control knob on the control panel of the power supply or power supply housing. Before cutting a workpiece, an operator is required to manually adjust the gas pressure or gas flow rate based on the process parameters set forth in a cut chart. The operator manually adjusts the gas pressure or flow rate for each type of cut and therefore, constantly refers to the cut chart for the appropriate gas pressure or flow rate. Moreover, if the operator inadvertently inputs an incorrect gas pressure or flow rate, the plasma arc torch can operate incorrectly or can operate inefficiently.

Another category of hand held systems eliminate the gas control by automatically setting the gas pressure based on the user selected current level and mode (i.e., gouging or cutting). This category of hand held plasma arc torches does not provide the operator with any flexibility in setting the gas pressure beyond the preset automated systems. Therefore, if the operator determines that the gas pressure or flow rate should be changed due to a changed operating parameter or to optimize the plasma arc torch, the operator does not have the flexibility to make these operational and/or optimizing adjustments.

SUMMARY OF THE INVENTION

A need, therefore, exists for a plasma arc torch, for example, a hand held plasma arc torch, that can allow an operator to have the gas pressure or flow rate settings automatically determined or to allow the operator to manually adjust the gas pressure or gas flow rate (e.g., by hand with a valve control mechanism). This provides the operator with flexibility in setting the gas pressure or flow rate beyond a purely automated system. The selection of automatic or manual gas control can occur through a control panel on the power supply or the plasma arc torch system.

A need also exists for a plasma arc torch system that can display descriptive functional, fault, or error messages as well as service information through a display on the power supply or the plasma arc torch system. This information can be displayed in different fault indication levels and can be used by the operator to adjust the gas pressure or gas flow rate in response to the fault codes. In addition, the fault information can be stored in a non-volatile memory that can provide the operator with previous fault information that can be needed, for example, when a service call is placed.

In one aspect, the invention features a portable plasma arc cutting system that includes a power supply and a plasma torch attachable to the power supply. The plasma torch can generate a plasma arc for cutting a workpiece. The plasma torch can be configured to generate a plasma arc for cutting a workpiece. A gas valve is disposed in the portable plasma arc cutting system or the plasma torch. The gas valve establishes a gas flow rate or a gas pressure in the plasma torch. A controller is within the portable plasma arc cutting system and is in communication with the power supply. The controller is capable of automatically manipulating the gas valve to establish the gas flow rate or the gas pressure based upon a predetermined operating condition. A user activated switch is in communication with the controller. The switch has a first setting which causes the controller to automatically establish the gas flow rate or the gas pressure based upon the predetermined operating condition, and a second setting which causes the controller to establish one of a user-determined gas flow rate or a user-determined gas pressure.

In another aspect, the invention features a portable plasma arc cutting system that includes a power supply and a plasma torch attachable to the power supply. The plasma torch generates a plasma arc for cutting a work piece. A display is disposed on the portable plasma arc cutting system for providing a user with information about the portable plasma arc cutting system. The display has an operation mode for displaying operation data about the plasma arc cutting system on the display. The operating data includes at least one of a gas pressure or a current. The display also has a service mode for displaying fault data about the plasma arc cutting system on the display. A controller is in communication with the power supply. The controller is capable of displaying the operation mode or the service mode on the display. A user activated switch is in communication with the controller and the display. The switch has an operation setting that causes the controller to provide the operation mode data to the display and a service setting that causes the controller to provide the service mode data to the display. The switch is configured to enable the user to toggle between at least the operation and service settings.

In another aspect, the invention features a plasma arc cutting system that includes means for supplying power and means for attaching a plasma torch to the means for supplying power. The plasma torch initiates a plasma arc for cutting a work piece. The means for supplying power can be, for example, a power supply or an ac/dc power source. The plasma torch can be attached to the means for supplying power by, for example, leads, or a connector (e.g., threads). The plasma arc cutting system also includes means for establishing a gas flow rate or a gas pressure from a gas source to the plasma torch, for example, a valve. The plasma arc cutting system includes means for automatically establishing the gas flow rate or the gas pressure of the gas based upon a predetermined operating condition, for example, through a controller (e.g., a microcontroller, a CPU, or a DSP). The plasma cutting system also includes means for manually establishing the gas flow rate or the gas pressure of the gas based upon a user-determined gas flow rate or a user-determined gas pressure, for example, through the use of a knob, buttons, slide bars or toggles. The plasma arc cutting system also includes means for switching between automatically establishing the gas flow rate or the gas pressure and manually establishing the gas flow rate or the gas pressure, for example, knobs, buttons, slide bars, or toggles.

The torch can be a hand held plasma arc torch. In some embodiments, the controller is a microcontroller, a CPU or a DSP. The user interface can be an LCD-type user interface, an LED display, a computer screen, a video display, a touch screen display, or any other type of display.

In some embodiments, the portable plasma arc cutting system also includes a control panel disposed on the portable plasma arc cutting system. The control panel can include the user activated switch and a user interface. The user interface can display a first display screen when the switch is in the first setting and a manual display screen when the switch is the in the second setting. The manual display screen can display a pressure or flow rate setting which is indicative of the gas pressure or flow rate supplied to the torch. In some embodiments, the control panel further includes at least one dial or button for adjusting at least one of the gas pressure or the gas flow rate in the second setting.

In some embodiments, the predetermined operating condition is at least one of a current setting, power supply type, torch type, material type, cutting surface, or material thickness.

The portable plasma arc cutting system can further include memory disposed in the power supply and in communication with the controller. The memory can be configured to save at least one of the predetermined operating condition, user-determined gas flow rate, or the user-determined gas pressure that was last entered into the plasma arc cutting system. The memory can also be configured to save the fault data in a fault log.

In some embodiments, the fault data displayed in the service mode includes fault codes.

Warnings can be displayed in the operation mode and details about the warnings are displayed in the service mode. The warnings include at least one of a fault icon, a fault code or a fault LED.

In some embodiments, the portable plasma arc cutting system also includes a control panel disposed on the portable plasma arc cutting system. The control panel can include the user activated switch and a user interface. In some embodiments, the user interface is an LCD-type user interface.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
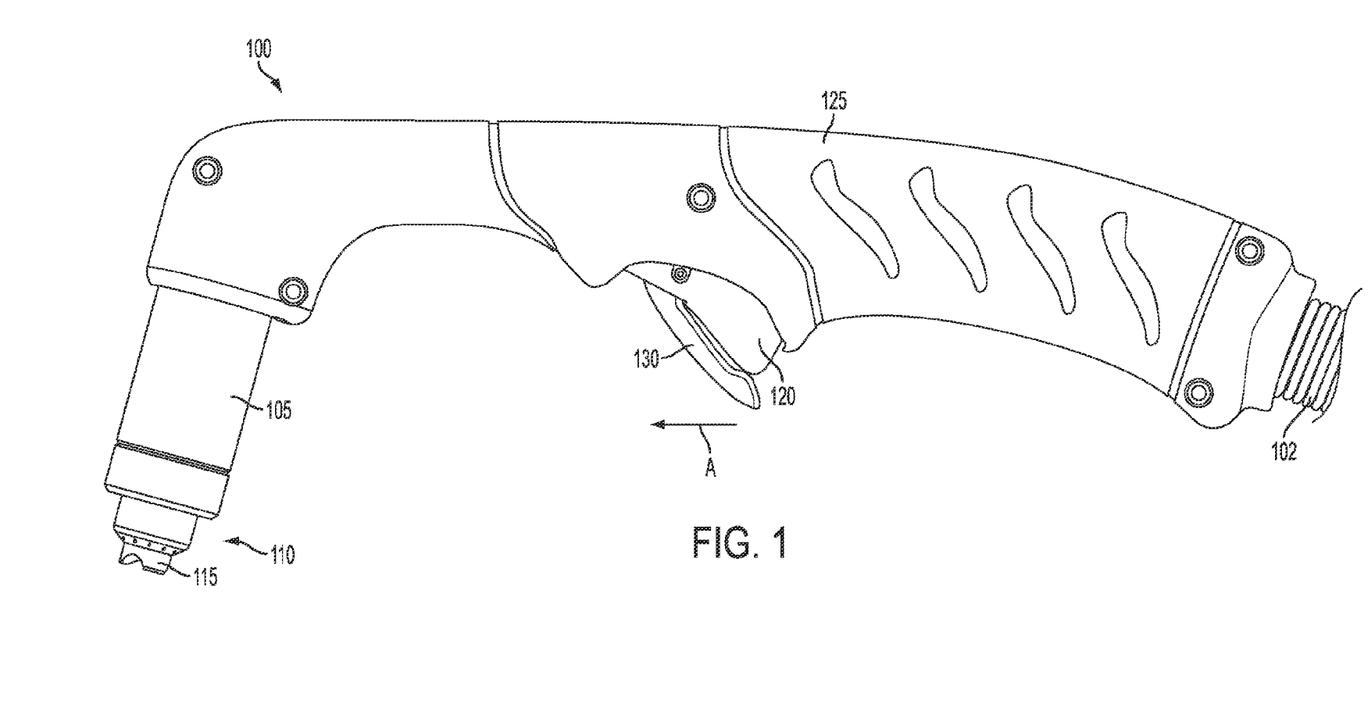
FIG. 1 is a side view of a hand held plasma arc torch.

FIG. 1 shows a portable (e.g., a hand held) plasma arc torch 100 that can generate a plasma arc for cutting a workpiece (not shown) when the plasma arc torch 100 is attached to a power supply (not shown) via connector 102, which can include, for example, electrical connections and gas flow lines. The plasma arc torch 100 generally includes a torch body 105 that defines a plasma gas flow path for directing a plasma gas to a plasma chamber in which a plasma arc is formed. An electrode (not shown) is disposed within the torch body 105. A nozzle (not shown) with a central exit orifice is disposed relative to the electrode at a distal end 110 of the torch body 105. The plasma arc torch 100 also includes a shield 115 disposed relative to an exterior surface of the nozzle at the distal end 110 of the torch body 105.

Portable plasma arc torches can be trigger-activated devices. That is, the torch 100 generates a plasma stream in response to operator activation of a trigger 120 disposed in the torch housing 125. Optionally, a displaceable safety member 130 can be disposed adjacent to the front surface of the trigger 120 to prevent the trigger 120 from inadvertently starting the plasma arc torch. For example, the safety member 130 can have two positions. In a first position, as shown in FIG. 1, the safety member 130 prevents an operator from activating the trigger 120. In a second position (e.g., when the safety member 130 is moved in the direction generally shown by arrow A), an operator can activate the trigger 120 to start the plasma arc torch 100 (see, for example, U.S. Pat. No. 5,597,497 to Hypertherm, Inc., the entire contents of which is hereby incorporated herein by reference).

Figure 2:
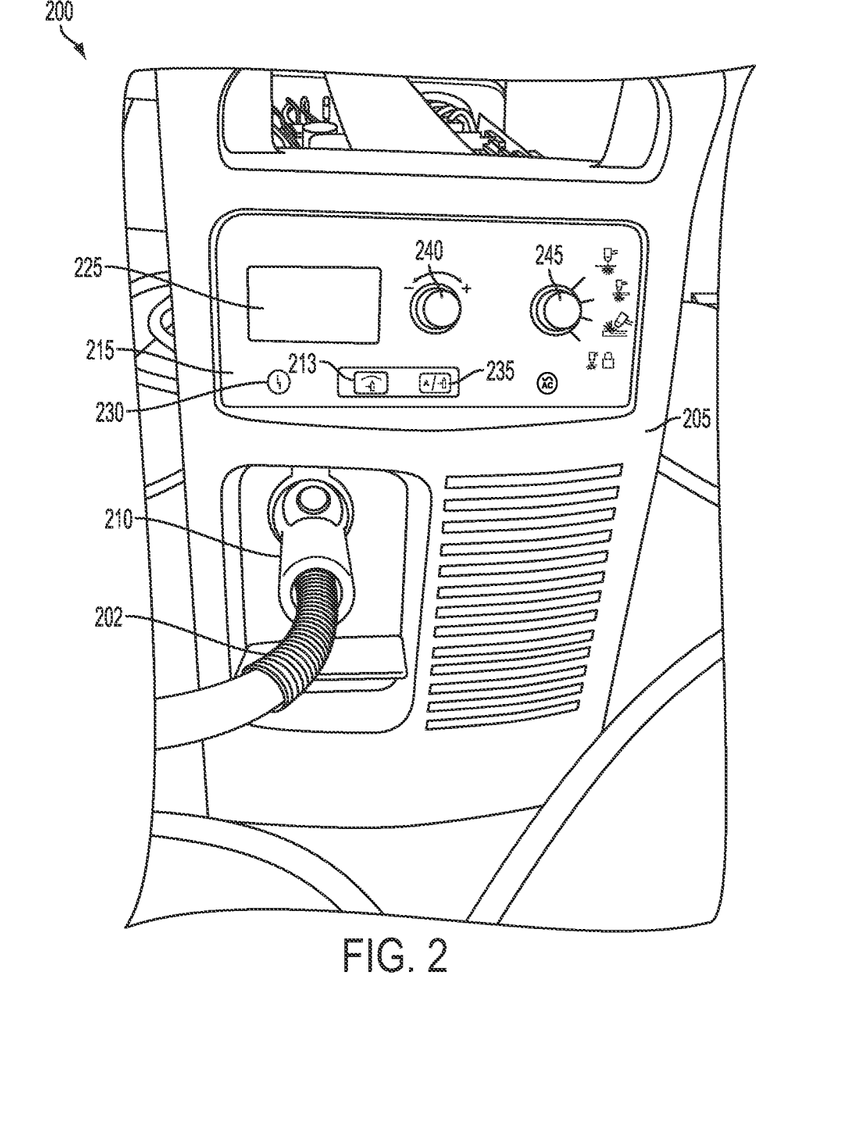
FIG. 2 is a front view of a portable plasma arc cutting system, according to an illustrative embodiment of the invention.

FIG. 2 shows a portable plasma arc cutting system 200 including an outer casing 205 that can house a power supply, a gas valve, and/or a controller. A hand held plasma arc torch (e.g., the plasma arc torch 100 of FIG. 1) can be attached to the power supply 205 at a connection area 210, for example, via connector 202, which can include, for example, electrical connections and gas flow lines. The connector 102, 202 can be flexible to allow easy maneuverability of the hand held plasma arc torch.

The portable plasma arc cutting system 200 can include a user activated switch 213 that can be used to switch between at least two settings. In some embodiments, a control panel 215 is disposed on the plasma arc cutting system 200 that comprises the user activated switch 213 and a user interface 225. The user interface 225 can be an LCD-type user interface, an LED-type user interface, a computer screen, a touch screen display, a video display, or any other type of user interface. The control panel 215 can also include, for example, a fault light 230 (e.g., an LED indicator light), a current/pressure selection button 235, a dial 240, and/or a cutting type knob 245. Although certain features of the control panel 215 are shown using knobs and buttons, any type of mechanism can be used, for example, dials, knobs, buttons, slide bars, toggles, keys, touch screens, switches, or any combination thereof.

In some embodiments, a display (not shown) is disposed on the portable plasma arc cutting system 200 and can be used to provide the operator with information concerning errors that occur within the portable plasma arc cutting system. The display can be disposed on the control panel 215, and can be in addition to the user interface 225 or can be part of the user interface 225. The display can provide a user with information about the portable plasma arc cutting system 200 and can have at least two modes. An operation mode can display operation data about the plasma arc cutting system 200, for example, cutting current, gas pressure, gas flow rate, cutting type, or any combination thereof. A service mode can display fault data about the plasma arc cutting system 200, for example, fault codes.

The operation mode can display warnings in addition to operation data. The details of the warnings can be displayed in the service mode. For example, the warnings can include a fault icon, a fault code, and/or a fault LED. The warning can alert the user that something is wrong with the plasma arc cutting system 200. The details that gave rise to the warning can be displayed in the service mode.

Figure 3A:
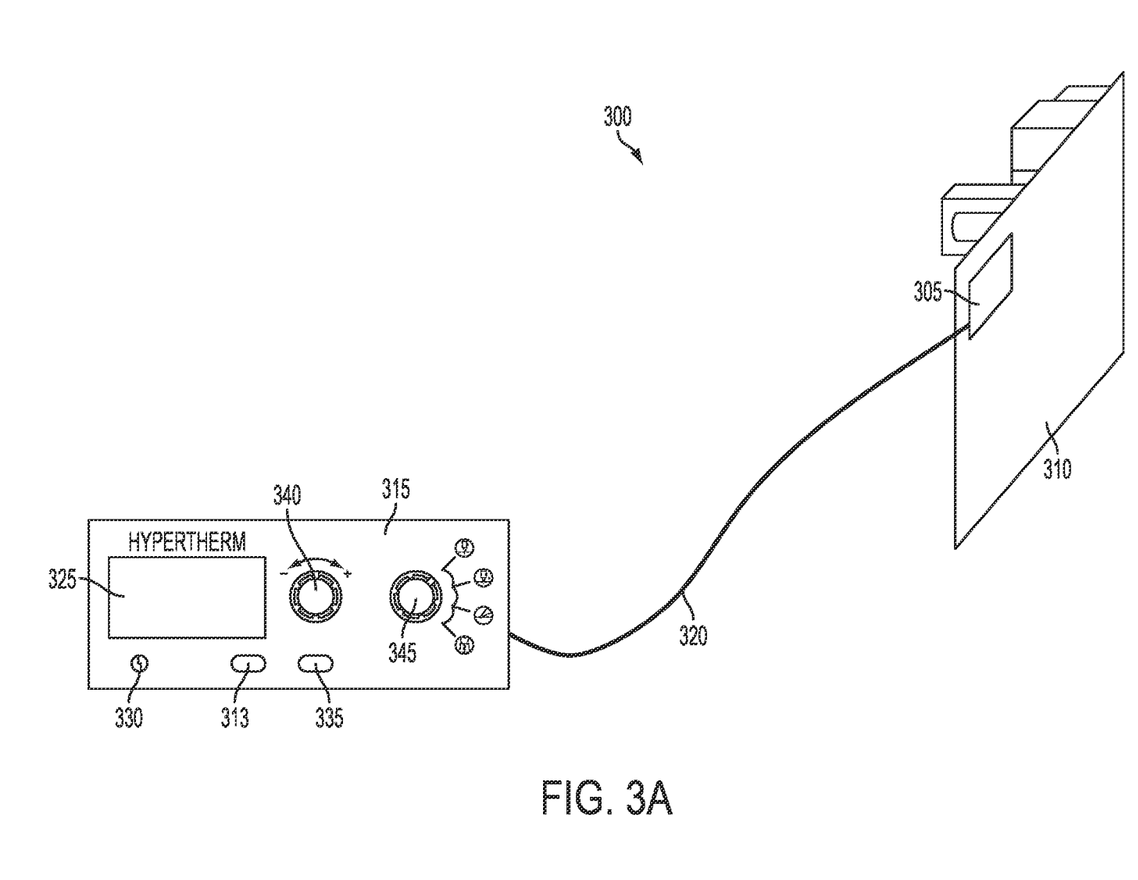
FIG. 3A is a schematic illustration of system architecture, according to an illustrative embodiment of the invention.

FIG. 3A shows an example of system architecture 300 that can be used within the portable plasma arc cutting system to enable an operator to switch between manually and automatically establishing a gas flow rate or a gas pressure. The system architecture 300 can also enable the operator to switch the user interface or display from operation mode to service mode.

As shown in FIG. 3A, a controller 305 is disposed within the portable plasma arc cutting system, for example, the portable plasma arc cutting system 200 of FIG. 2. The controller 305 is in communication with a power supply 310 and is capable of automatically manipulating the gas valve (not shown) to establish the gas flow rate or the gas pressure based upon a predetermined operating condition. The controller 305 can also manipulate the gas valve to establish a user-determined gas flow rate or a user-determined gas pressure. The controller 305 is also in communication with the control panel 315 over communication line 320. In some embodiments, the controller is in communication with the control panel 315 over a wireless network.

The power supply 310 can be a power printed circuit board ("PCB") that can comprise most of the power components and hardware fault monitoring functions. A digital signal processor ("DSP") PCB can be used as the controller 305 and can be attached to the power PCB. The DSP PCB can comprise a single chip DSP that implements control and/or sequencing algorithms. A control PCB with a microcontroller can be used as the control panel 315 and can implement the user interface functions. The control PCB and the DSP PCB can be communication through a serial link of the ModBus over RS486 and can serve as the communication line 320. The DSP PCB can handle all of the faults and/or errors and can populate the fault flags into a fault table. It can also summarize the faults into predefined standard fault codes and display codes that can be passed to the control PCB for display.

Similar to FIG. 2, the control panel 315 of FIG. 3A can include a user activated switch 313, a user interface 325, fault lights 330, a current/pressure selection button 335, a dial 340, and/or a cutting type knob 345. In some embodiments, the controller 305 is capable of displaying operation mode or service mode data on a display, for example, the user interface 225 of FIG. 2, in response to a user selecting service mode or operation mode via the user activated switch. The controller 305 can be a microcontroller, a CPU controller, a DSP controller, or any other type of controller that is capable of automatically manipulating a gas valve.

Figure 3B:
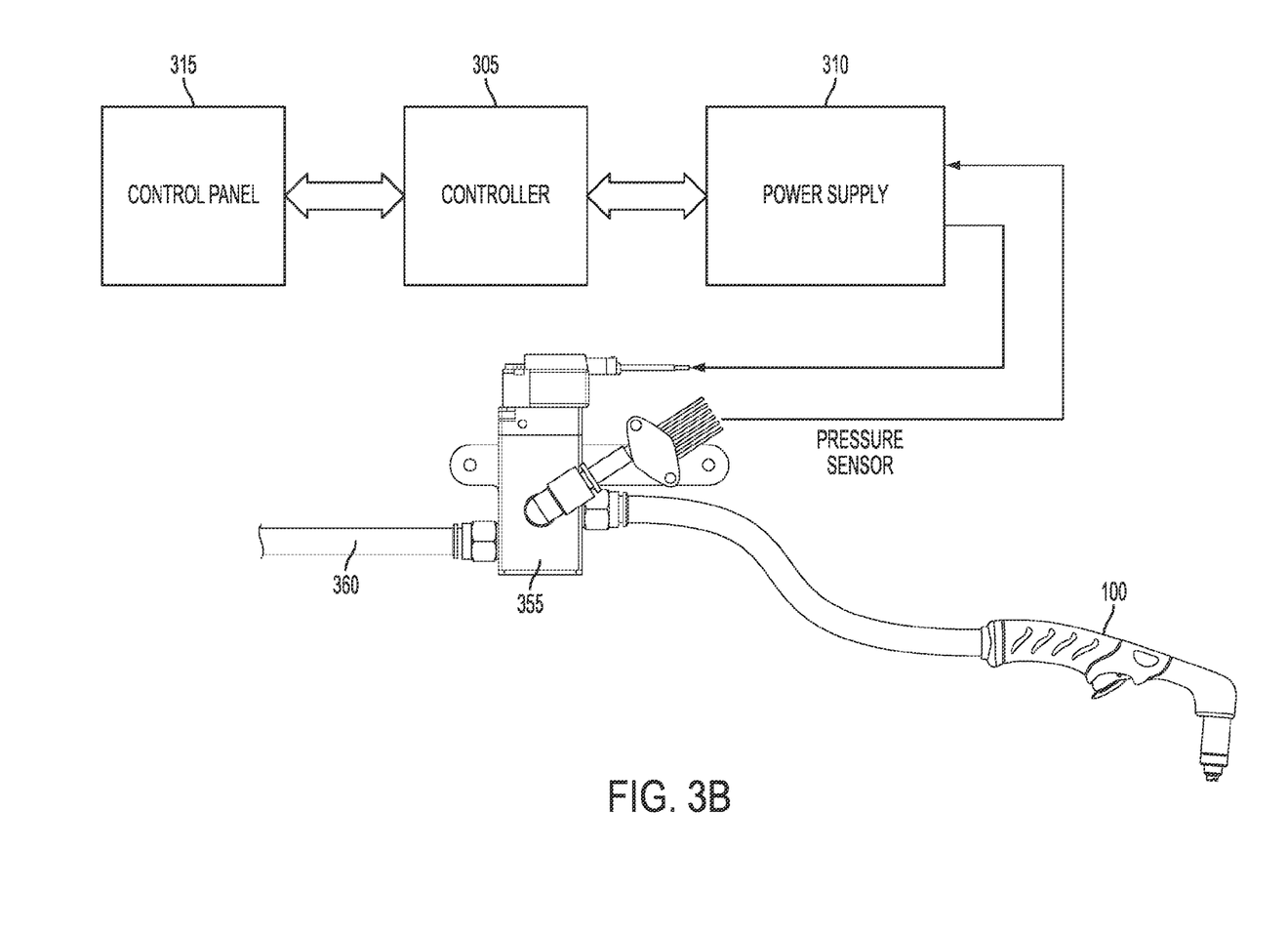
FIG. 3B is a schematic illustration of a plasma arc torch system including a gas valve, according to an illustrative embodiment of the invention.

FIG. 3B shows a plasma arc torch system 350 including a gas valve 355 that can be housed in an outer casing (e.g., outer casing 205 of FIG. 2). In some embodiments, the gas valve 355 is disposed in the hand held plasma arc torch instead of housed in the outer casing (e.g., outer casing 205 of FIG. 2). Gas enters the plasma arc torch system 350 from gas input 360. The gas valve 355 establishes a gas flow rate or a gas pressure of the plasma arc torch. The controller 305 is in communication with a power supply 310 and is capable of automatically manipulating the gas valve 355 (e.g., changing the gas valve from a closed position to an open position or to a partially open position) to establish the gas flow rate or the gas pressure based upon a predetermined operating condition. The controller 305 can also manipulate the gas valve 355 to establish a user-determined gas flow rate or a user-determined gas pressure.

The user activated switch (e.g., the user activated switch 213 of FIG. 2) can have a variety of settings or multiple user activated switches can be used. In some embodiments, the user activated switch has two settings, a first setting and a second setting. When the user activated switch is in the first setting, the controller 305 automatically establishes the gas flow rate or the gas pressure based upon a predetermined operating condition. The predetermined operating condition can be, for example, a current setting, a power supply type, a torch type, a material type, a cutting surface, a material thickness, or any combination thereof. The predetermined operating condition or conditions can be entered by the user prior to starting the plasma arc torch via the control panel, display screen and/or user interface. For example, the predetermined operating condition can be the type of cut that is being made (e.g., a gouging type cut). The operating can select this type of cut by adjusting cutting type knob 245 of FIG. 2 and the controller can automatically set the gas flow rate or gas pressure based on the user-entered cut type.

In some embodiments, the controller automatically establishes the gas flow rate or gas pressure by using a pre-defined parameter table that can be stored in a memory. The memory can be disposed within the portable plasma arc cutting system, for example, in the power supply. The memory is in communication with the controller 305. The pre-defined parameter table can be pre-loaded into the portable plasma arc cutting system and can enable the controller to look up various variables or operating conditions (e.g., a current setting, a power supply type, a torch type, a material type, a cutting surface, a material thickness, or any combination thereof) and select an appropriate gas flow rate and/or gas pressure based on these operating condition(s). The parameter table can be indexed by a variety of different variables including, for example, torch type (e.g., a hand held torch or a mechanized torch), the torch length, and/or the cut mode (e.g., cutting or gouging).

When the user activated switch is in the second setting, the user inputs a gas flow rate or a gas pressure, for example, by adjusting dial 240 of FIG. 2, and the controller 305 establishes this user-determined gas flow rate or gas pressure by manipulating the gas valve. In the second setting, the controller does not have to look up the gas flow rate or gas pressure in a pre-defined parameter table because this information has been input into the plasma system by the operator.

The operator can decide to switch between the first and second settings based on the operators' desire to control the specific operating parameters of the torch. For example, the operator can decide to manually operate the plasma arc torch to optimize the cutting procedure after the portable plasma arc torch has been operating automatically, or in the first setting. The user can stop the torch (e.g., by releasing the trigger 120 of FIG. 1) and adjust the user activated switch to the second or manual setting (e.g., by pressing button 213 of FIG. 2, or by holding down button 213 for a specified period of time, for example, two to five seconds). In the second setting, the controller (e.g., controller 305 of FIG. 3A) establishes one of a user-determined gas flow rate or a user-determined gas pressure. For example, referring to FIG. 2, the gas flow rate and/or the gas pressure can be displayed on the user interface 225 and the user can increase or decrease the gas flow rate and/or the gas pressure by adjusting dial 240 when the user activated switch 213 is in the second setting.

In some embodiments, the user activated switch 213 has more than two settings. For example, in addition to the first and second settings, the user activated switch 213 can have an operation setting that causes the controller to provide operation mode data to the display and a service setting that causes the controller to provide service mode data to the display. The switch 213 can be configured to enable to user to toggle between at least the operation and service settings. In some embodiments, the switch 213 is configured to enable to the user to toggle between the first, second, operation and service settings.

In some embodiments, there are multiple user activated switches. For example, there can be a first user activated switch that can allow the user to toggle between the first and second settings and a second user activated switch that can allow the user to toggle between the operation and service settings. In some embodiments, the operation mode is the same as the first or second setting, depending on whether the portable plasma arc torch is being operated automatically or manually. The control panel can also have a series of keys, for example three or four, which allow the user to toggle between the first, second, operation, and service settings. In some embodiments, the user can enter the service setting by pushing the user activated switch 213 and the current/pressure selection button 235 simultaneously.

Referring to FIG. 2, the user interface 225 can display different information using multiple different displays when the plasma arc torch is being operated in an automatic mode or in a manual mode. For example, when the user activated switch 213 is in the first setting and the hand held plasma arc torch is being operated automatically, a first display screen can be displayed. When the user activated switch 213 is in the second setting and the hand held plasma arc torch is being operated manually, a manual display screen can be displayed. The manual display screen can display a pressure or flow rate setting which is indicative to the gas pressure or flow rate supplied to the torch and can allow the user to manipulate these settings.

In addition, the user interface 225 can display operation mode data in the operation setting and service data in the service setting. In some embodiments, the operation mode data is displayed in the manual display screen and/or the first or automatic display screen.

Figure 4:
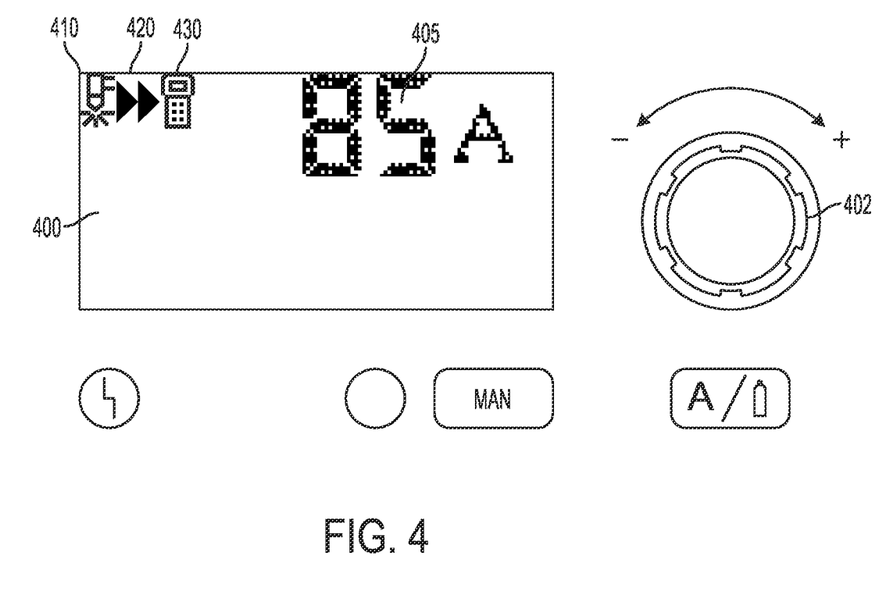
FIG. 4 is a schematic illustration of an automatic gas pressure or flow rate setting mode, according to an illustrative embodiment of the invention.
Figure 5:
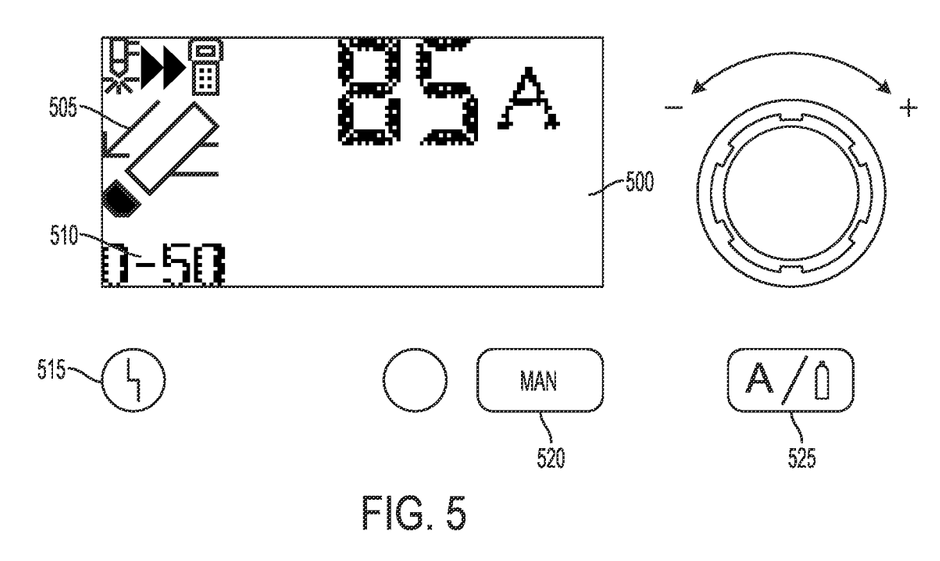
FIG. 5 is a schematic illustration of an automatic gas pressure or flow rate setting mode with fault icons, according to an illustrative embodiment of the invention.
Figure 6:
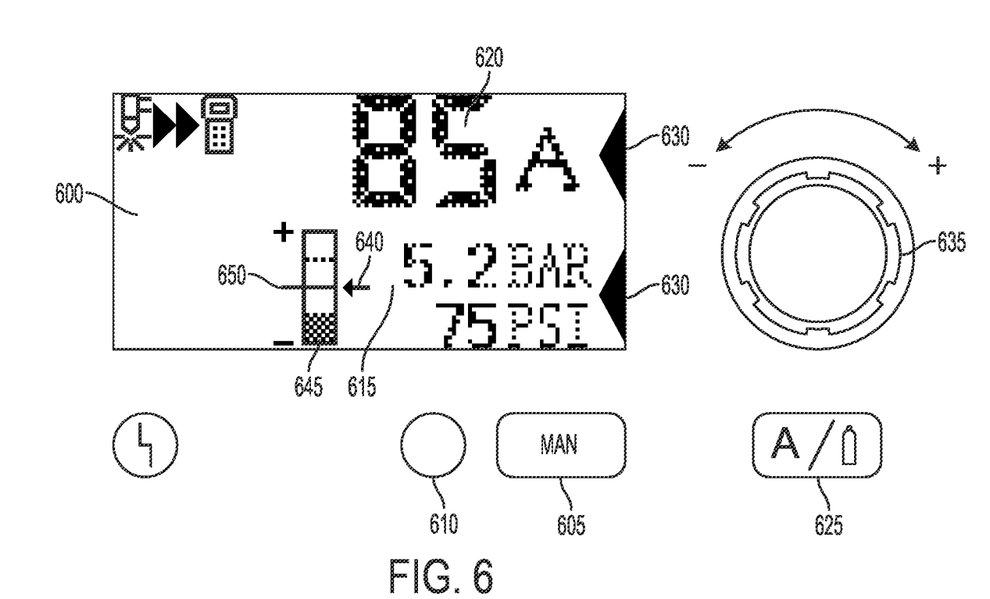
FIG. 6 is a schematic illustration of a manual gas pressure or flow rate setting mode, according to an illustrative embodiment of the invention.
Figure 7:
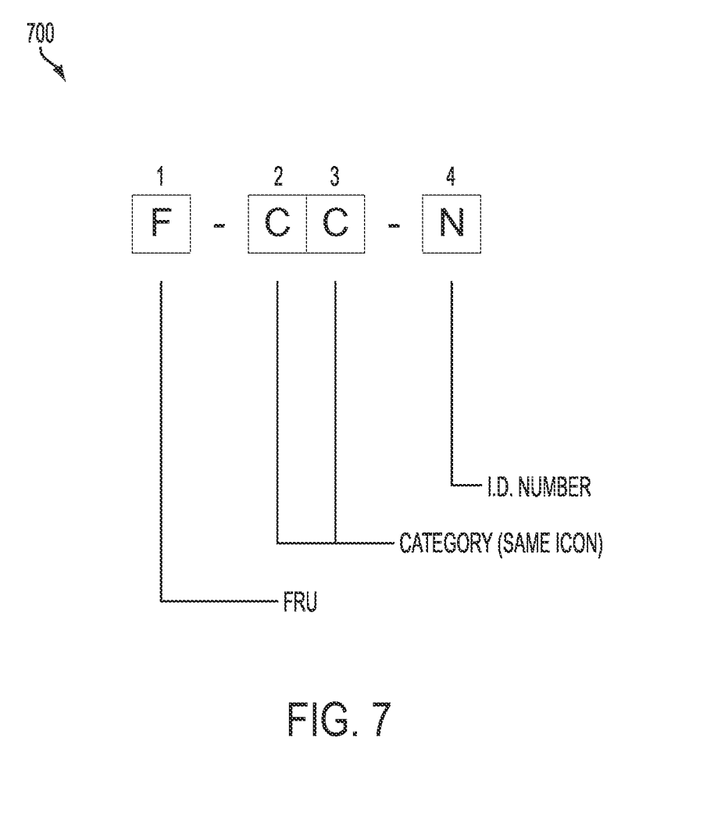
FIG. 7 is a schematic illustration of a fault code, according to an illustrative embodiment of the invention.
Figure 8:
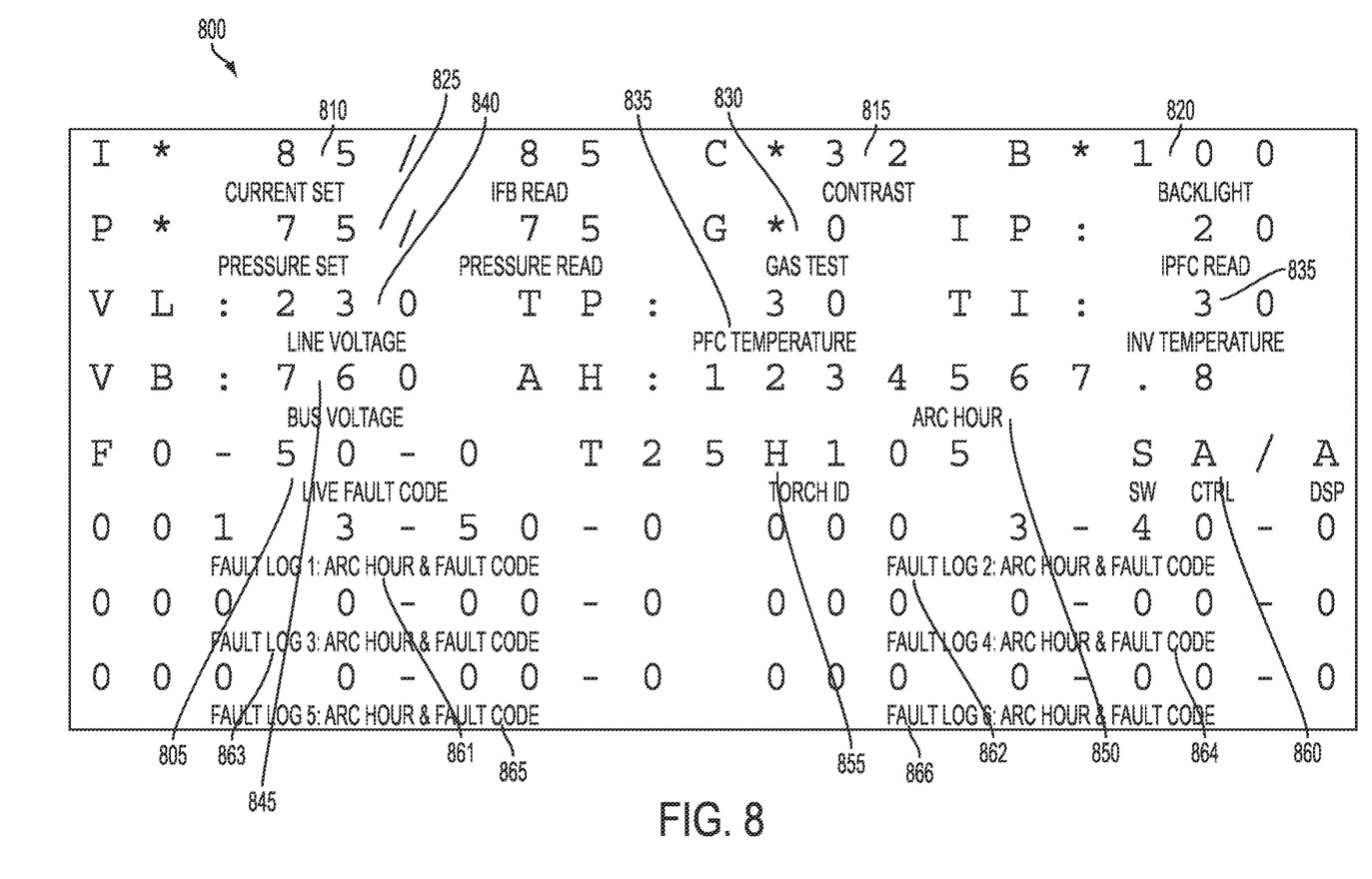
FIG. 8 is a schematic illustration of a service screen, according to an illustrative embodiment of the invention.

FIGS. 4-8 depict the variety of different information that can be displayed on the user interface and/or display. FIG. 4 is a schematic illustration of an automatic gas pressure or flow rate setting mode; FIG. 5 is a schematic illustration of an automatic gas pressure or flow rate setting mode with fault icons; FIG. 6 is a schematic illustration of a manual gas pressure or flow rate setting mode; FIG. 7 is a schematic illustration of a fault code; and FIG. 8 is a schematic illustration of a service screen.

Referring to FIG. 4, an example of a display screen 400 is shown when the portable plasma arc torch is in the first or automatic gas pressure setting mode under normal operation. In the automatic gas pressure setting mode, the gas pressure can set based on a pre-defined parameter table stored in memory. In the automatic gas pressure setting mode, the operator adjusts the cutting current, for example, by adjusting the knob 402. When the knob is turned, the current setting 405 on the display screen 400 is updated to inform the operator of the new current setting and the controller automatically adjusts the gas flow rate or the gas pressure based on the selected cutting current and the pre-defined parameter table.

The display screen 400 can have several different icons that can quickly inform the operator about the plasma arc torch operating parameters. In some embodiments, each operating parameter has a separate icon. For example, the display screen 400 indicates a current setting 405 and that the current is set at 85 Amps.

When the portable plasma arc torch is started (e.g., when the user presses trigger 120 of FIG. 1), the power supply will start to pilot and the screen 400 can display the start icon 410. When the portable plasma arc torch starts to cut after the arc is transferred to the workpiece, the display screen 400 can display the mech. motion icon 420.

In some embodiments, the power supply is controlled by a remote controller, for example, a computer numeric controller ("CNC"). When the power supply is controlled by a remote controller, the remote icon 430 can be displayed on the screen 400. In some embodiments, all of the local controls are displayed when the power supply is controlled by a remote controller.

Referring to FIG. 5, if a fault or error occurs within the portable plasma arc cutting system, the display screen 500 can display a fault icon 505, and/or a fault code 510. The fault icon 505 can be displayed either with or without the fault code 510. The fault icon 505 can quickly alert the operator to what caused the fault. The fault code 510 can be displayed in a short and grouped format. For example, in FIG. 5 the fault code 510 is displayed as 0-50. A fault code of 0-50 can represent, for example, that there is a problem with a consumable. A fault LED 515 can also light up when a fault occurs as an additional means to alert the operator that something is wrong with the portable plasma arc cutting system.

FIG. 6 illustrates an example of a display screen 600 when an operator is using the second or manual gas pressure setting mode in normal operation. The operator can switch between manual and automatic mode by pushing the user-activated switch, shown in FIG. 6 as a "Manual/Auto" button 605, on the display screen. After the "Manual / Auto" selection button 605 is pushed, the system enters the manual gas pressure setting mode. The Manual LED 610 can light up to indicate that the portable plasma arc system is in the manual gas pressure or gas flow setting mode (e.g., the second setting). The gas pressure setting 615 can be displayed on the screen. In this mode, the current setting 620 or gas pressure setting 615 can be adjusted by selecting the "Current/Pressure" selection button 625. The cursor 630 can indicate whether the current setting 620 or the gas pressure setting 615 will be changed when the adjustment knob 635 is manipulated. Pushing the "Manual/Auto" selection button 605 again will exit the "manual gas pressure setting" mode and enter the "automatic gas pressure setting" mode (e.g., the mode displayed in display screen 400 of FIG. 4).

When the operator is adjusting the gas pressure setting 615, an arrow 640 of a pressure bar 645 can move up or down, depending on whether the pressure is being increased or decreased, respectively. The center point 650 of the pressure bar 645 can be the nominal pressure value when the portable plasma arc torch is being operated in the automatic gas pressure setting. In some embodiments, the maximum and minimum amount of pressure, or the maximum and minimum change in the pressure, is pre-set. This can be a fail-safe to ensure that the operator does not enter a pressure that is too high or too low for the portable plasma arc torch cutting system to operate.

The operator can toggle between automatic gas pressure setting mode and manual gas pressure setting mode, for example by pushing the "Manual/Auto" selection button 605. When the operator exits manual gas pressure setting mode, the system can store the manual settings that were entered by the user in memory and display those settings when the operator returns to manual mode. In some embodiments, the system can store multiple manual settings in memory. The memory can be configured to save at least one of the predetermined operating condition, the user-determined gas flow rate or the user-determined gas pressure that was last entered into the plasma arc cutting system.

The control panel and display screen of the portable plasma arc cutting system can also be used to enter and exit a service mode. In some embodiments, the service mode can be entered by pressing the "Manual/Auto" selection button 605 or holding the "Manual/Auto" selection button 605 down for a predetermined amount of time (e.g., two to five seconds). Service mode can also be entered by pushing the "Manual/Auto" selection button 605 and the "Current/Pressure" section button 625 simultaneously for a predetermined amount of time (e.g., two to five seconds). Requiring an operator to hold down the buttons for a predetermined period of time can prevent the operator from inadvertently entering the service mode. In some embodiments, service mode is entered immediately when the "Manual/Auto" selection button 605 and the "Current/Pressure" section button 625 are pressed simultaneously. In some embodiments, a separate button or toggle is used to enter the service mode.

The system can also display a fault log with full length fault codes. FIG. 7 illustrates an example of a full length fault code 700 (for example, the fault code 700 can be the full length fault code of the fault code 510 of FIG. 5). The fault code 700 can have four numbers (e.g., represented by the numbers 1-4 on FIG. 7); however, more or less numbers can be used depending on the amount of information to be displayed. The four numbers of the fault code 700 represent different information about the fault or error that occurred within the portable plasma arc torch system. For example, the first number of the fault code 700 can display the Field Replicable Unit ("FRU), which indicates on which part or subassembly the error occurred. The second and third numbers of the fault code 700 can display the Category, which groups the errors or failures based on the type of fault that occurred, for example, operational, hardware, and/or a warning. The fourth number of the fault code 700 can display the I.D. Number, which can correspond to a specific description in a table that the operator can look up when calling a service center. The I.D. Number can provide the operator with a more detailed description of the error than the other numbers of the fault code 700. In some embodiments, a manual can list all of the fault codes and provide additional detail about why the fault was triggered. The fault code 700 can be cross-referenced with the manual to determine why the fault was triggered and/or how to fix the problem.

A fault priority can be assigned based on the fault code value. For example, the bigger the number, the higher the fault priority. In some embodiments, only one fault code is set at a time. In this embodiment, if there are multiple faults, then only the fault with the highest priority will be displayed.

The service mode screen can display the environment and operation variables of the plasma arc torch system. For example, the service mode screen can display temperature measurements, which are not displayed during normal operation.

FIG. 8 illustrates an example of a service screen 800. As an example, referring to FIG. 5, the fault code 510 that is displayed on the normal operation display screen is 0-50. If the operator wants to obtain additional information about this fault, the operator can enter service mode by pressing the "Manual/Auto" selection button 520 and the "Current/Pressure" section button 525 together for two seconds to enter service mode. When service mode is entered, the operator can see a screen that resembles service screen 800. This screen 800 provides the operator with an additional layer of information about the fault 510 of FIG. 5 as shown by fault 805. The operator can look up fault code 0-50-0 in a manual to obtain additional information about the fault. As shown in FIGS. 5 and 8, the fault code is only displayed in full in the service mode. In the operation mode, only two to three digits are displayed.

In some embodiments, the portable plasma arc cutting system can store a limited number of faults, for example four to fifty faults in a non-volatile memory as a fault log. The fault log can include data about the faults, including, for example, the time of the fault, the fault code, or the operating conditions under which the fault occurred. This can be particularly useful when the system needs to be repaired or serviced since a repairman will be able to see the previous errors that occurred within the portable plasma arc cutting system.

While in the service screen 800 the operator can also make necessary adjustments to current 810, contrast 815, backlight 820, pressure setting 825, and gas test 830. The parameters that can be adjusted are highlighted by the * mark in FIG. 8. In addition, the operator can see additional features in the service mode that the operator cannot see in other modes, for example the temperature of the primary power components 835, input line and bus voltage 840, 845 respectively, cumulative arc hours of system operation 850, torch ID 855, software control revision 860, and recording of the last 6 faults events and their time of occurrence 861, 862, 863, 864, 865, 866.

Although various aspects of the disclosed apparatus and method have been shown and described, modifications may occur to those skilled in the art upon reading the specification. The present application includes such modifications and is limited only by the scope of the claims.

What is claimed is:

1. A portable plasma arc cutting system comprising:
a power supply;
a plasma torch attachable to the power supply and generating a plasma arc for cutting a workpiece;
a gas valve disposed in the portable plasma arc cutting system or the plasma torch, the gas valve establishing a gas flow rate or a gas pressure in the plasma torch;
a controller within the portable plasma arc cutting system and in communication with the power supply, the controller capable of automatically manipulating the gas valve to establish the gas flow rate or the gas pressure based upon a predetermined operating condition; and
a user activated switch in communication with the controller, the switch having a first setting which causes the controller to automatically establish the gas flow rate or the gas pressure based upon the predetermined operating condition, and a second setting which causes the controller to establish one of a user-determined gas flow rate or a user-determined gas pressure by increasing or decreasing the gas flow rate or the gas pressure by manipulating the gas valve based on information that has been input into the plasma arc cutting system by a user.

2. The portable plasma arc cutting system of claim 1 wherein the controller is a microcontroller or a DSP.

3. The portable plasma arc cutting system of claim 1 further comprising a control panel disposed on the portable plasma arc cutting system, the control panel comprising the user activated switch and a user interface.

4. The portable plasma arc cutting system of claim 3 wherein the user interface is an LCD-type user interface.

5. The portable plasma arc cutting system of claim 3 wherein the control panel further comprises at least one dial or button for adjusting at least one of the gas pressure or the gas flow rate in the second setting.

6. The portable plasma arc cutting system of claim 1 wherein the predetermined operating condition is at least one of a current setting, power supply type, torch type, material type, cutting surface, or material thickness.

7. The portable plasma arc cutting system of claim 1 further comprising memory disposed in the power supply and in communication with the controller, the memory configured to save at least one of the predetermined operating condition, user-determined gas flow rate, or the user-determined gas pressure that was last entered into the plasma arc cutting system.

8. The portable plasma arc cutting system of claim 1 wherein the torch is a hand held torch.

9. The portable plasma arc cutting system of claim 3 wherein the user interface displays a first display screen when the switch is in the first setting and a manual display screen when the switch is the in the second setting.

10. The portable plasma arc cutting system of claim 9 wherein the manual display screen displays a pressure or flow rate setting which is indicative of the gas pressure or flow rate supplied to the torch.

11. A portable plasma arc cutting system comprising:
a power supply;
a plasma torch attachable to the power supply and generating a plasma arc for cutting a workpiece;
a gas valve disposed in the portable plasma arc cutting system or the plasma torch, the gas valve establishing a gas flow rate or a gas pressure in the plasma torch;
a controller within the portable plasma arc cutting system and in communication with the power supply, the controller of automatically manipulating the gas valve to establish the gas flow rate or the as pressure based upon a predetermined operating condition;
a user activated switch in communication with the controller. the switch having
a first setting which causes the controller to automatically establish the gas flow rate or the gas pressure based upon the predetermined operating condition. and
a second setting which causes the controller to establish one of a user-determined gas flow rate or a user-determined gas pressure; and
a control panel disposed on the portable plasma arc cutting system. the control panel comprising the user activated switch and a user interface, wherein the user interface displays a first display screen when the switch is in the first setting and a manual display screen when the switch is the in the second setting.

12. The portable plasma arc cutting system of claim 11 wherein the manual display screen displays a pressure or flow rate setting which is indicative of the gas pressure or flow rate supplied to the torch.

13. A portable plasma arc cutting system comprising:
a power supply;
a plasma torch attachable to the power supply and generating a plasma arc for cutting a work piece;
a display disposed on the portable plasma arc cutting system for providing a user information about the portable plasma arc cutting system, the display having an operation mode for displaying operation data about the plasma arc cutting system on the display, the operating data including at least one of a gas pressure or a current, and a service mode for displaying fault data about the plasma arc cutting system on the display;
a controller in communication with the power supply, the controller capable of displaying the operation mode or the service mode on the display; and
a user activated switch in communication with the controller and the display, the switch having an operation setting that causes the controller to provide the operation mode data to the display and a service setting that causes the controller to provide the service mode data to the display, the switch configured to enable the user to toggle between at least the operation and service settings.

14. The portable plasma arc cutting system of claim 13 wherein the fault data displayed in the service mode includes fault codes.

15. The portable plasma arc cutting system of claim 13 further comprising memory disposed in the power supply and in communication with the controller, the memory configured to save the fault data in a fault log.

16. The portable plasma arc cutting system of claim 13 wherein warnings are displayed in the operation mode and details about the warnings are displayed in the service mode.

17. The portable plasma arc cutting system of claim 16 wherein the warnings include at least one of a fault icon, a fault code or a fault LED.

18. The portable plasma arc cutting system of claim 13 wherein the controller is a microprocessor or a DSP.

19. The portable plasma arc cutting system of claim 13 further comprising a control panel disposed on the portable plasma arc cutting system, the control panel comprising the user activated switch and a user interface.

20. The portable plasma arc cutting system of claim 19 wherein the user interface is an LCD-type user interface.

21. The portable plasma arc cutting system of claim 13 wherein the torch is a hand held torch.

22. A plasma arc cutting system comprising:
means for supplying power;
means for attaching a plasma torch to the means for supplying power and initiating a plasma arc for cutting a work piece;
means for establishing a gas flow rate or a gas pressure from a gas source to the plasma torch;
means for automatically establishing the gas flow rate or the gas pressure of the gas based upon a predetermined operating condition;
means for manually establishing the gas flow rate or the gas pressure of the gas based upon a user-determined gas flow rate or a user-determined gas pressure; and means for switching between automatically establishing the gas flow rate or the gas pressure and manually establishing the gas flow rate or the gas pressure, wherein manually establishing the gas flow rate or the gas pressure comprises manipulating the gas valve based on information that has been input into the plasma arc cutting system by a user.

\* \* \* \* \*

UNITED STATES PATENT AND TRADEMARK OFFICE
CERTIFICATE OF CORRECTION

PATENT NO.         : 8,853,588 B2
APPLICATION NO.    : 13/151799
DATED              : October 7, 2014
INVENTOR(S)        : Junsong Mao et al.

It is certified that error appears in the above-identified patent and that said Letters Patent is hereby corrected as shown below:

In the claims,

Column 11, line 39, claim 9, replace "when the switch is the in the second setting" with --when the switch is in the second setting--.

Column 11, line 53, claim 11, replace "controller of automatically manipulating" with --controller capable of automatically manipulating--.

Column 11, line 54, claim 11, replace "the gas flow rate or the as pressure" with --the gas flow rate or the gas pressure--.

Column 12, line 3, claim 11, replace "display screen when the switch is the in the second setting" with --display screen when the switch is in the second setting--.

Signed and Sealed this
Twenty-first Day of July, 2015

Michelle K. Lee
*Director of the United States Patent and Trademark Office*